United States Patent
Yamada et al.

(10) Patent No.: US 12,528,204 B2
(45) Date of Patent: Jan. 20, 2026

(54) END EFFECTOR ATTACHMENT APPARATUS, END EFFECTOR, AND ROBOT ARM MECHANISM

(71) Applicant: FANUC CORPORATION, Yamanashi (JP)

(72) Inventors: Itsuki Yamada, Yamanashi (JP); Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 420 days.

(21) Appl. No.: 18/265,168

(22) PCT Filed: Dec. 21, 2021

(86) PCT No.: PCT/JP2021/047170
§ 371 (c)(1),
(2) Date: Jun. 2, 2023

(87) PCT Pub. No.: WO2022/138600
PCT Pub. Date: Jun. 30, 2022

(65) Prior Publication Data
US 2024/0109202 A1 Apr. 4, 2024

(30) Foreign Application Priority Data

Dec. 25, 2020 (JP) ................. 2020-216693

(51) Int. Cl.
*B25J 15/04* (2006.01)
*B25J 15/06* (2006.01)
*B25J 19/00* (2006.01)

(52) U.S. Cl.
CPC ....... *B25J 15/0441* (2013.01); *B25J 15/0616* (2013.01); *B25J 19/0075* (2013.01)

(58) Field of Classification Search
CPC ............... B25J 15/0441; B25J 15/0616; B25J 19/0075; B25J 19/063; B25J 19/0083; B25J 17/0208
See application file for complete search history.

(56) References Cited

U.S. PATENT DOCUMENTS

2020/0016746 A1 1/2020 Yap et al.
2021/0032034 A1* 2/2021 Kalouche ............... B25J 9/1612
(Continued)

FOREIGN PATENT DOCUMENTS

JP S58-155194 A 9/1983
JP H01-166081 U 11/1989
(Continued)

OTHER PUBLICATIONS

International Search Report issued in PCT/JP2021/047170 mailed on Mar. 22, 2022 with English Translation (7 pages).
(Continued)

*Primary Examiner* — Gerald McClain
(74) *Attorney, Agent, or Firm* — HAUPTMAN HAM, LLP

(57) ABSTRACT

An end effector attachment apparatus is an apparatus to be attached to an end effector of a robot. The end effector attachment apparatus includes a base plate, a mount plate on which the end effector is mounted, an attraction mechanism for attracting the mount plate to the base plate, and a bellows coupling the mount plate to the base plate. The front and rear edges of the bellows are sealed to the base plate and the mount plate to secure a sealed space inside the bellows.

6 Claims, 15 Drawing Sheets

(56) References Cited

U.S. PATENT DOCUMENTS

2024/0246764 A1* 7/2024 Kalouche ............ B65G 1/1371
2025/0010473 A1* 1/2025 Sawa ..................... B25J 9/1697
2025/0243012 A1* 7/2025 Long .................... A01D 46/005

FOREIGN PATENT DOCUMENTS

| JP | 03043176 A | * | 2/1991 |
| JP | H03-043176 A | | 2/1991 |
| JP | 04019086 A | * | 1/1992 |
| JP | H04-019086 A | | 1/1992 |
| JP | 05138488 A | * | 6/1993 |
| JP | H05-138488 A | | 6/1993 |
| JP | 05220691 A | * | 8/1993 |
| JP | H05-220691 A | | 8/1993 |
| JP | 08132374 A | * | 5/1996 |
| JP | H08-132374 A | | 5/1996 |
| JP | 2008214054 A | * | 9/2008 |
| TW | 201536493 A | | 10/2015 |

OTHER PUBLICATIONS

Written Opinion of the International Searching Authority issued in PCT/JP2021/047170 mailed on Mar. 22, 2022 with English Translation (8 pages).

* cited by examiner

END EFFECTOR ATTACHMENT APPARATUS, END EFFECTOR, AND ROBOT ARM MECHANISM

TECHNICAL FIELD

Embodiments described herein relate generally to an end effector attachment apparatus, an end effector, and a robot arm mechanism.

BACKGROUND ART

In recent years, with the proliferation of robots, safety measures for robots have become important. As a safety measure for robots, there is known a method of stopping a robot when an end effector attached to the robot collides with a person, an object, or the like. However, with this method, the robot continues to move after the load associated with the collision of the end effector with a person or an object is detected until the robot is completely stopped. Therefore, the end effector and the robot may be damaged, or the person or the object may be damaged. Further, when the end effector collides with a relatively large object, the robot stops with the end effector pushed into the collided object; therefore, it takes much time to evacuate and return the robot. In order to shorten the return time, for example, Patent Literature 1 discloses a robot hand attachment/detachment apparatus that prevents a hand member from falling from a robot's wrist, and enables quick removal when the hand member is removed from a flange member.

CITATION LIST

Patent Literature

Patent Literature 1; Japanese Unexamined Utility Model Application Publication No. 01-166081

DETAILED DESCRIPTION

Figure 1:
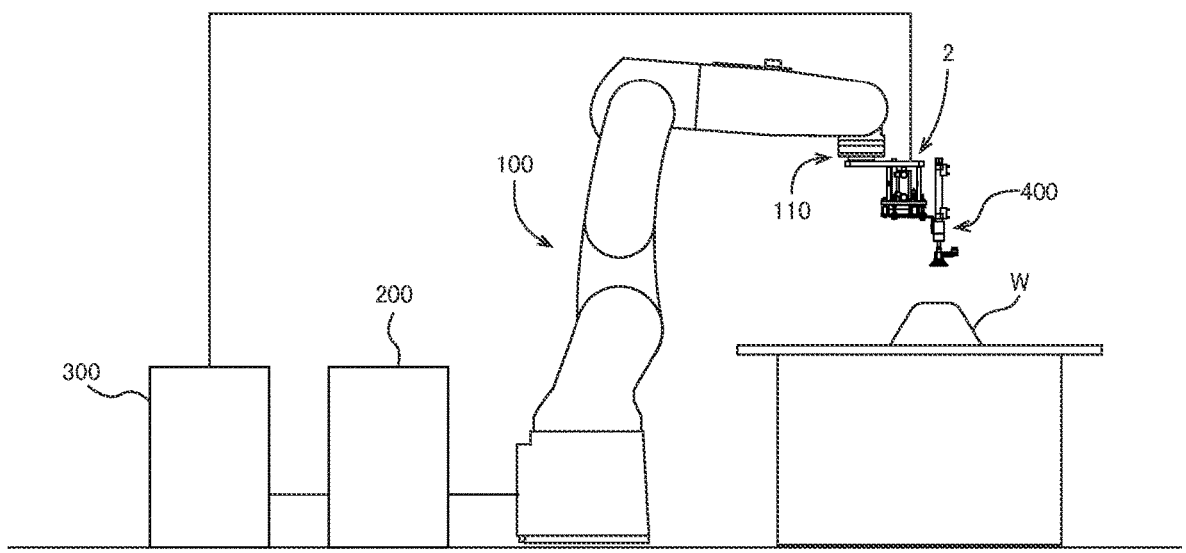
FIG. 1 is an external view showing the entire system including an end effector attachment apparatus according to a first embodiment.

An end effector attachment apparatus according to one aspect of the present disclosure is an apparatus to be attached to an end effector of a robot. The end effector attachment apparatus includes a base plate, a mount plate on which the end effector is mounted, an attraction mechanism for attracting the mount plate to the base plate, and a bellows coupling the mount plate to the base plate. The front and rear edges of the bellows are sealed to the base plate and the mount plate to secure a sealed space inside the bellows.

Hereinafter, end effector attachment apparatuses according to the first and second embodiments will be described with reference to the drawings. In the following description, constituent elements having substantially the same function and configuration are denoted by the same reference numeral, and repetitive descriptions will be given only where necessary.

First Embodiment

An end effector attachment apparatus 2 according to the first embodiment is an apparatus whose one purpose is to avoid a situation in which an end effector 400 and a robot arm mechanism 100 equipped with the end effector 400 are damaged when the end effector 400 collides with an obstacle. As shown in FIG. 1, the end effector attachment apparatus 2 constitutes one system together with a control apparatus 200 for controlling the operation of the end effector attachment apparatus 2 and a pressurization/depressurization apparatus 300 for pressurizing/depressurizing the insides of a bellows 5 and a cylinder 71 of the end effector attachment apparatus 2. Typically, the end effector attachment apparatus 2 is interposed between the robot arm mechanism 100 and the end effector 400. Specifically, the end effector attachment apparatus 2 is attached to an attachment portion 110 for the end effector 400 of the robot arm mechanism 100, and the end effector 400 is connected to the robot arm mechanism 100 via the end effector attachment apparatus 2. In the first embodiment, the end effector 400 includes a suction pad for sucking a workpiece W.

The control apparatus 200 include a storage device, such as an HDD, storing therein an impact mitigation operation program describing an impact mitigation operation by the end effector attachment apparatus 2, a return operation program describing a return operation by the end effector attachment apparatus 2, and a lifting and lowering operation program describing a lifting and lowering operation by the end effector attachment apparatus 2, an arithmetic processing device, such as a CPU, for executing the programs stored in the storage device, and the like. When the arithmetic processing device executes the impact mitigation operation program, the end effector attachment apparatus 2 operates in accordance with the sequence (see FIG. 6) defined by the impact mitigation operation program. This makes it possible to mitigate the impact received by the end effector 400 and the robot arm mechanism 100 when the end effector 400 collides with an obstacle. When the arithmetic processing device executes the return operation program, the end effector attachment apparatus 2 operates in accordance with the sequence (see FIG. 7) defined by the return operation program. This allows the end effector attachment apparatus 2 deformed by the collision of the end effector 400 with the obstacle to return to the original state before the collision of the end effector 400 with the obstacle. When the arithmetic processing device executes the lifting and lowering operation program, the end effector attachment apparatus 2 operates in accordance with the sequence (see FIG. 10) defined by the lifting and lowering operation program. This allows the end effector 400 to be lowered and the lowered end effector 400 to be returned to its original position. In the first embodiment, the control apparatus 200 has both functions of controlling the end effector attachment apparatus 2 and controlling the robot arm mechanism 100. Of course, the controller of the end effector attachment apparatus 2 may be configured separately from the controller of the robot arm mechanism 100.

The pressurization/depressurization apparatus 300 includes a pump, an air tube, and a solenoid valve. The solenoid valve switches between a suction port and an exhaust port of the pump with respect to the air tube. The control apparatus 200 controls the driving of the solenoid valve of the pressurization/depressurization apparatus 300, thereby switching between supply and discharge of air to and from the inside of the bellows 5 and the inside of the cylinder 71. Of course, the configuration is not limited to this as long as the supply and discharge of air inside the bellows 5 and the cylinder 71 can be controlled.

Figure 2:
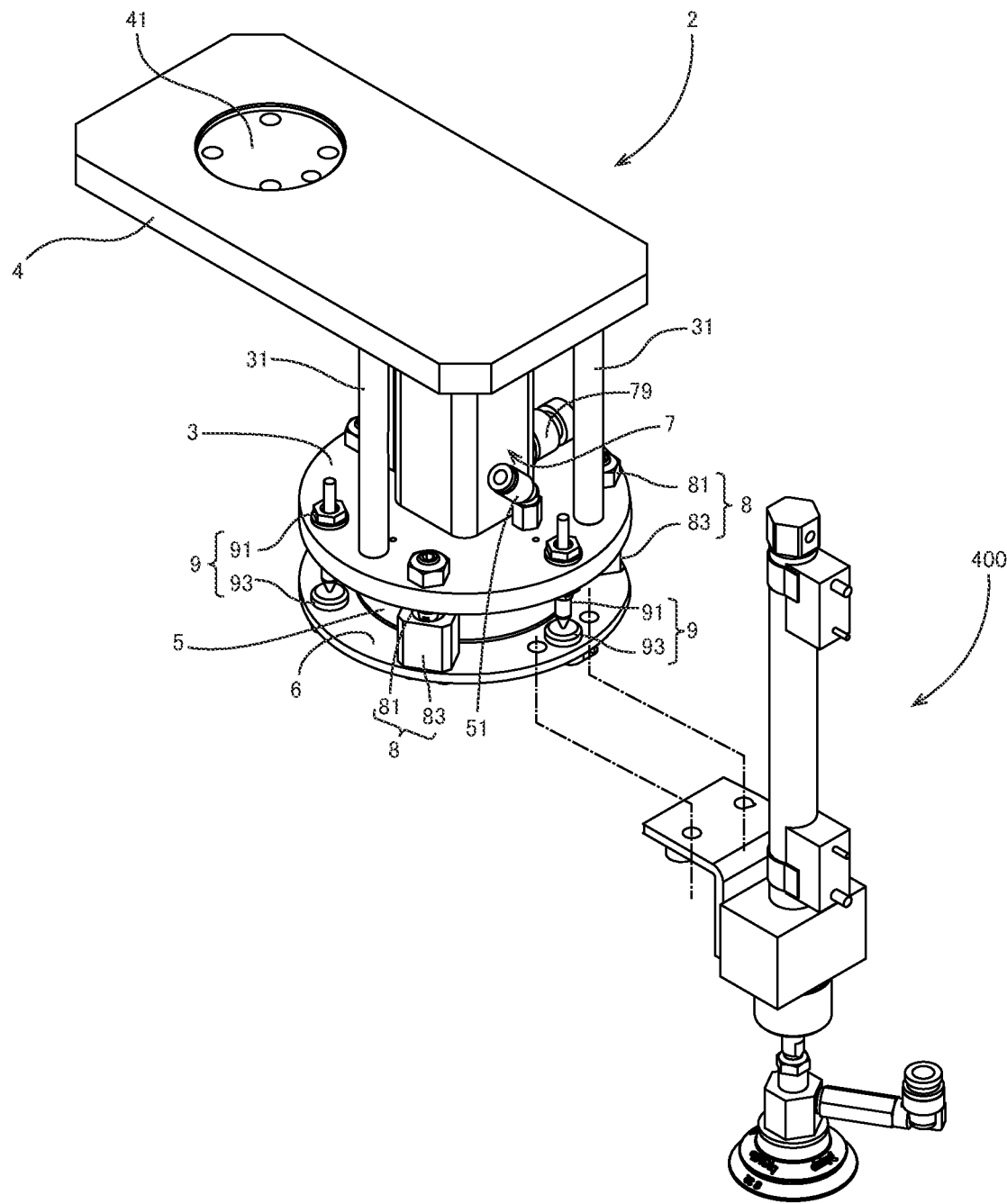
FIG. 2 is a perspective view showing an example of the end effector attachment apparatus according to the first embodiment.
Figure 3:
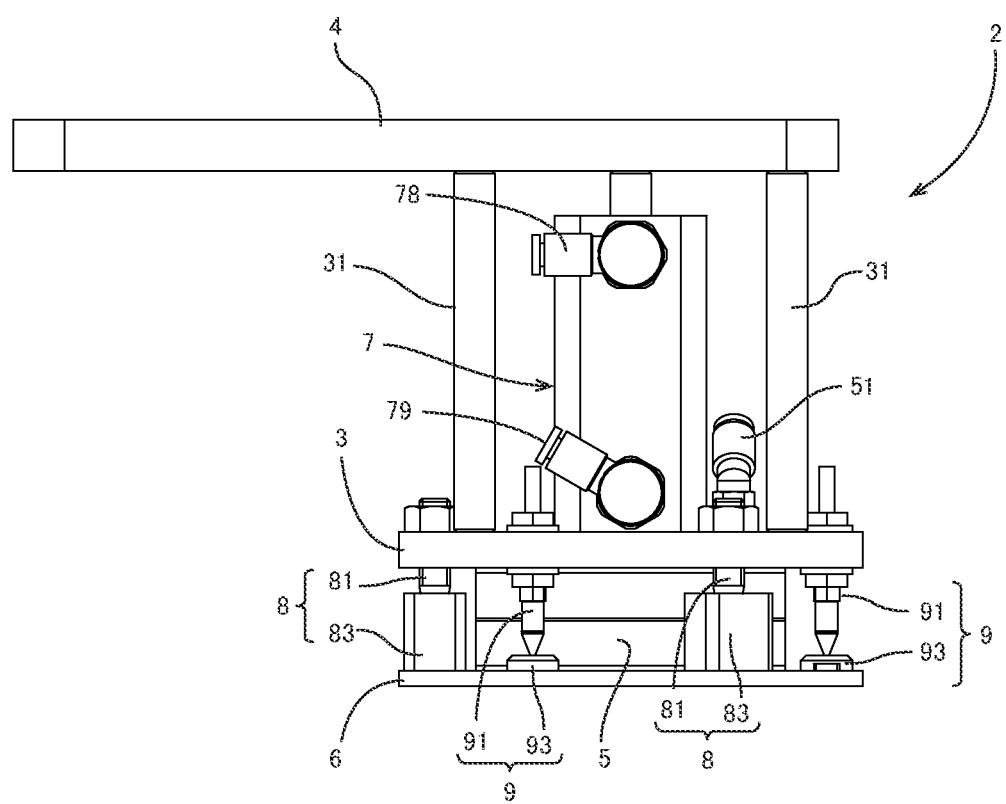
FIG. 3 is a side view showing a state where a bellows of the end effector attachment apparatus shown in FIG. 2 is contracted.
Figure 4:
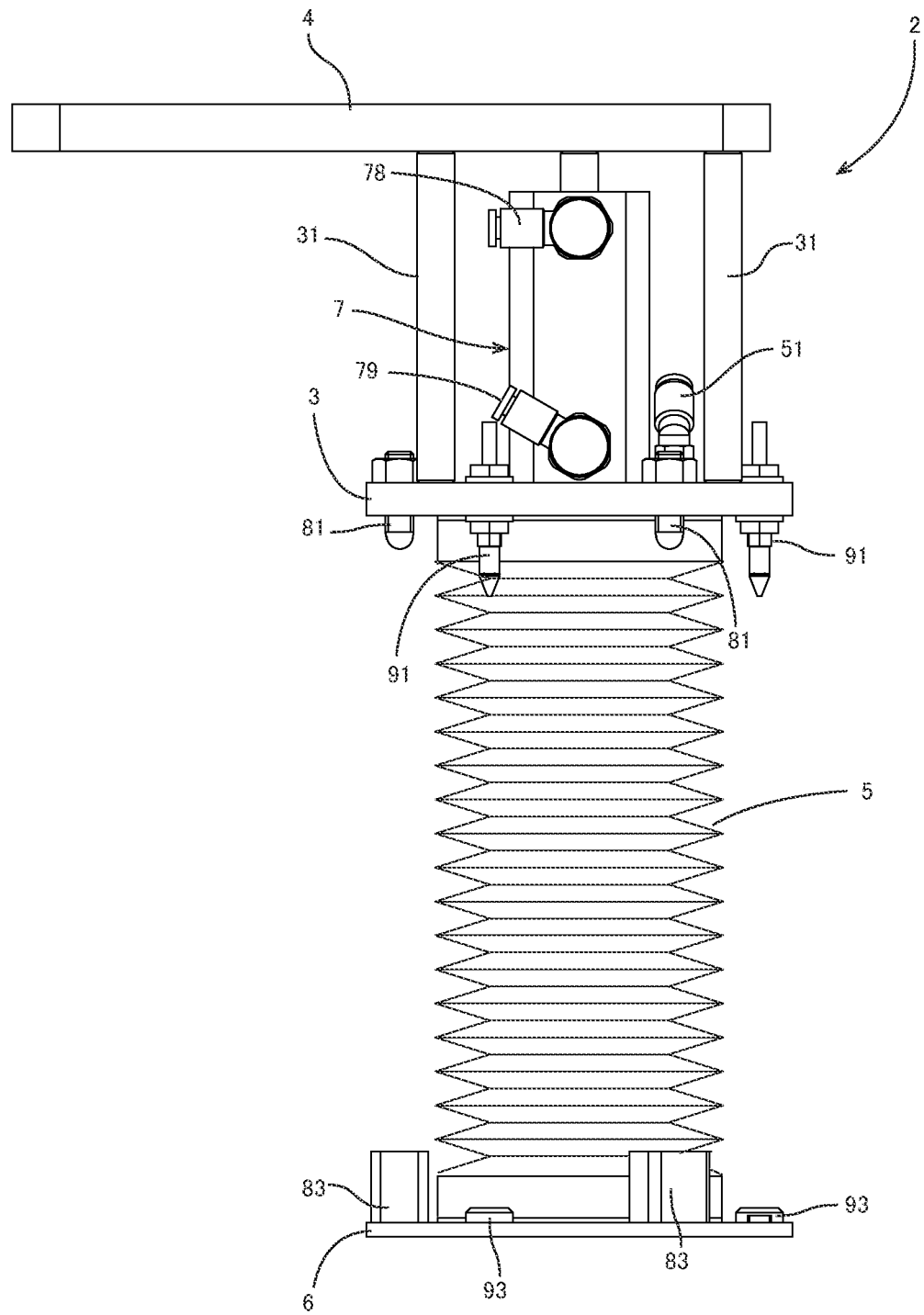
FIG. 4 is a side view showing a state where the bellows of the end effector attachment apparatus shown in FIG. 2 is extended.

As shown in FIG. 2, FIG. 3, and FIG. 4, the end effector attachment apparatus 2 has a disk-shaped base plate 3. A rectangular plate-shaped adapter plate 4 is fixed to the upper surface of the base plate 3 via a plurality of support poles 31. The adapter plate 4 has an adapter 41 that is connected to the end effector attachment portion 110 of the robot arm mechanism 100. The end effector attachment apparatus 2 is attached to the end effector attachment portion 110 of the robot arm mechanism 100 via the adapter plate 4 A circular mount plate 6 is suspended from the lower surface of the base plate 3 by the bellows 5. The mount plate 6 is configured to be attracted to the base plate 3 by an attraction mechanism 7 to be described later. Typically, the mount plate 6 is made of a magnetic material so as to be attracted to a magnet. Of course, the mount plate 6 may be made of a non-magnetic material and provided with an attraction piece made of a magnetic material that can be attracted to a magnet. The end effector 400 is connected to the mount plate 6 directly or indirectly via another member.

A plurality of ball plungers 81 are arranged at equal intervals along the circumferential direction on the lower surface of the base plate 3, and a plurality of ball receiving portions 83 with depressions for receiving the balls of the plurality of ball plungers 81 are arranged at equal intervals along the circumferential direction on the upper surface of the mount plate 6. The ball plungers 81 and the ball receiving portions 83 constitute a positioning mechanism 8 for determining the position and orientation of the mount plate 6 with respect to the base plate 3. The mount plate 6 can be arranged at a predetermined position (hereinafter referred to as an initial position) by the positioning mechanism 8.

Contact pins of a plurality of contact sensors 91 are provided on the lower surface of the base plate 3 so as to protrude downward, and a plurality of pin receiving portions 93 with surfaces for receiving the contact pins of the contact sensors 91 are provided on the upper surface of the mount plate 6. The pin receiving portions 93 are configured such that the surfaces for receiving the contact pins are above the upper surface of the mount plate 6. The contact sensors 91 and the pin receiving portions 93 for receiving the contact pins of the contact sensors 91 constitute a misalignment detection unit 9 for detecting misalignment of the mount plate 6 with respect to the base plate 3. Misalignment here includes misalignment in a plane parallel to the lower surface of the base plate 3 and misalignment in a direction perpendicular to the lower surface of the base plate 3. The misalignment detection unit 9 functions as a sensor for detecting a collision of the end effector 400 with an obstacle, and also functions as a sensor for detecting whether or not the mount plate 6 is arranged at a predetermined position and orientation with respect to the base plate 3. The sensor data of the plurality of contact sensors 91 is sent to the control apparatus 200.

Figure 5:
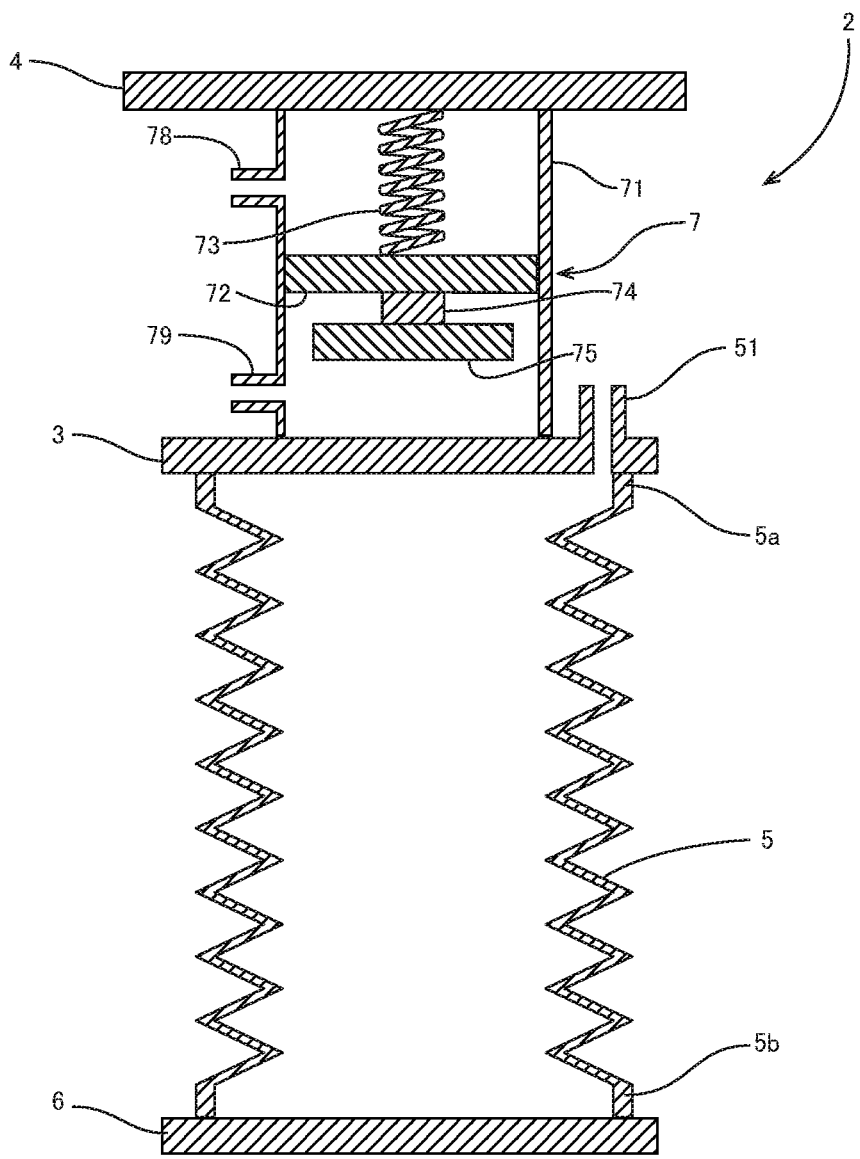
FIG. 5 is a cross-sectional view showing internal structures of an attraction mechanism and the bellows of the end effector attachment apparatus shown in FIG. 2.

One feature of the end effector attachment apparatus 2 according to the first embodiment is that a sealed space is secured inside the bellows 5. Specifically, as shown in FIG. 5, in order to secure a sealed space inside the bellows 5, the opening of the bellows 5 on the rear end side 5a is sealed by the base plate 3, and the opening on the front end side 5b is sealed by the mount plate 6. The base plate 3 is provided with a bellows port 51 that penetrates therethrough vertically. An air tube extending from the pressurization/depressurization apparatus 300 is connected to the bellows port 51. The inside of the bellows 5 is thereby connected to the pressurization/depressurization apparatus 300. By securing a sealed space inside the bellows 5, the bellows 5 can be contracted by depressurizing the inside of the bellows 5 and extended by pressurizing the inside of the bellows 5. By extending the bellows 5 immediately after the end effector 400 collides with an obstacle, the impact caused by the collision of the end effector 400 with the obstacle can be mitigated, and by contracting the bellows 5 extended to mitigate the impact, the end effector attachment apparatus 2 can be returned to the state before the collision. One feature of the end effector attachment apparatus 2 according to the first embodiment is that the mitigation operation for mitigating the impact caused by the collision of the end effector 400 and the return operation for returning the end effector attachment apparatus 2 to the original state are achieved only by controlling the pressurization and depressurization of the inside of the bellows 5, in which the sealed space is formed, without using a complicated mechanism.

The attraction mechanism 7 is provided on the base plate 3. Typically, the attraction mechanism 7 is configured to attract the mount plate 6 by magnetic force. Specifically, as shown in FIG. 5, the attraction mechanism 7 includes a magnet 75 and a magnet support mechanism for supporting the magnet 75 to be vertically movable. The magnet support mechanism includes a cylindrical cylinder 71, a plate-shaped piston 72 which vertically divides the inside of the cylinder 71, and a compression coil spring 73 that supports the piston 72 to be vertically movable. One end of the compression coil spring 73 is connected to the top of the inner surface of the cylinder 71, and the other end thereof is connected to the upper surface of the piston 72. The magnet 75 is fixed to the lower surface of the piston 72 via a pin 74. Typically, a double-acting type can be employed as the driving system of the piston 72. The cylinder 71 is provided with two cylinder ports 78, 79 penetrating its side surface and dispersed vertically across the piston 72. The air tubes extending from the pressurization/depressurization apparatus 300 are connected to the cylinder ports 78, 79, respectively.

When the attraction function of the attraction mechanism 7 is turned off by the control apparatus 200, the pressurization/depressurization apparatus 300 discharges air inside the cylinder 71 from the upper cylinder port 78 and supplies air into the cylinder 71 from the lower cylinder port 79 in accordance with the control of the control apparatus 200. Since the magnet 75 is pulled up together with the piston 72 in a direction away from the mount plate 6 and is located in an upper part of the inside of the cylinder 71, the distance between the magnet 75 and the mount plate 6 increases, and the mount plate 6 cannot be attracted by the magnetic force of the magnet 75.

When the attraction function of the attraction mechanism 7 is turned on by the control apparatus 200, the pressurization/depressurization apparatus 300 supplies air into the cylinder 71 from the upper cylinder port 78 and discharges air inside the cylinder 71 from the lower cylinder port 79 in accordance with the control of the control apparatus 200. Since the magnet 75 is pushed down together with the piston 72 in a direction toward the mount plate 6, and is located in a lower part of the inside of the cylinder 71, the mount plate 6 is attracted by the magnetic force of the magnet 75. The magnetic force of the magnet 75 and the distance between the magnet 75 and the mount plate 6, and the like are adjusted so that the attraction force of the mount plate 6 by the attraction mechanism 7 becomes smaller than the load received when the end effector 400 collides with an obstacle. This allows the control apparatus 200 to determine whether or not the end effector 400 has collided with an obstacle by ON/OFF of the contact sensors 91. When the attraction function of the attraction mechanism 7 is turned on, the supply/discharge of air through the two cylinder ports 78, 79 by the pressurization/depressurization apparatus 300 may be stopped in accordance with the control of the control apparatus 200 so that the inside of the cylinder 71 is returned to the atmospheric pressure. Since the magnet 75 is biased toward the lower side of the cylinder 71 by the compression coil spring 73, when the inside of the cylinder 71 is returned to the atmospheric pressure, the magnet 75 is pushed down together with the piston 72 by the compression coil spring 73 in the direction toward the mount plate 6, and is located in a lower part of the inside of the cylinder 71.

Figure 8:
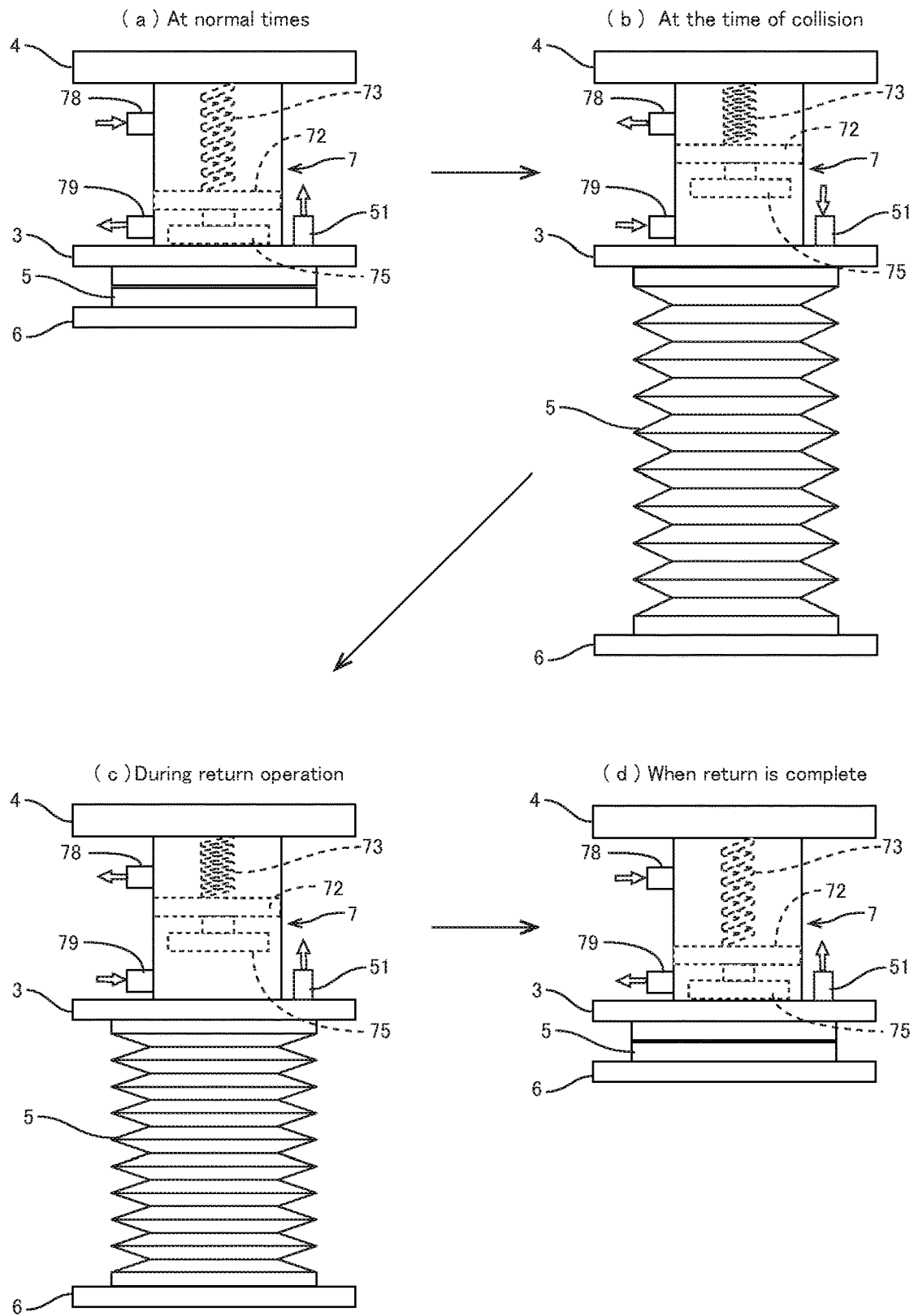
FIG. 8 is a diagram supplementing the description of the operations of the end effector attachment apparatus shown in FIG. 6 and FIG. 7.
Figure 9:
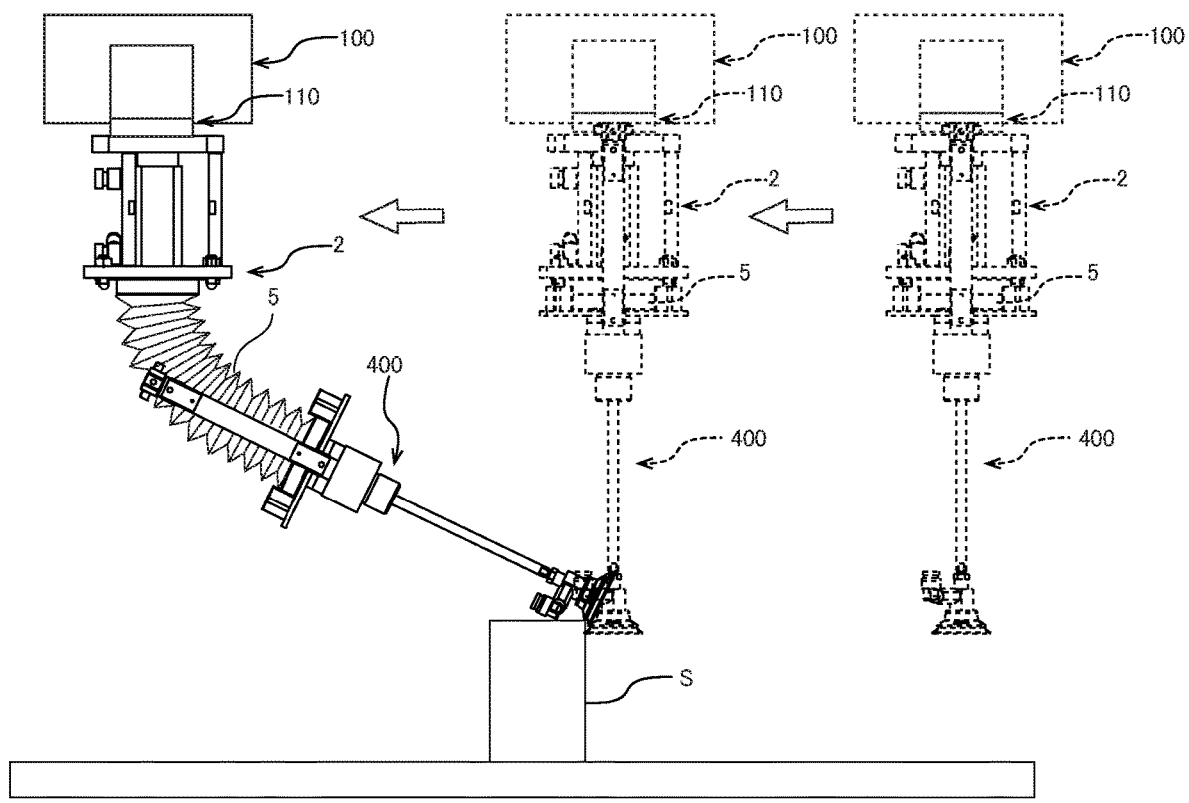
FIG. 9 is a diagram illustrating effects of the end effector attachment apparatus according to the first embodiment.

Hereinafter, the impact mitigation operation by the end effector attachment apparatus 2 according to the first embodiment will be described with reference to FIG. 6, FIG. 8, and FIG. 9.

Figure 6:
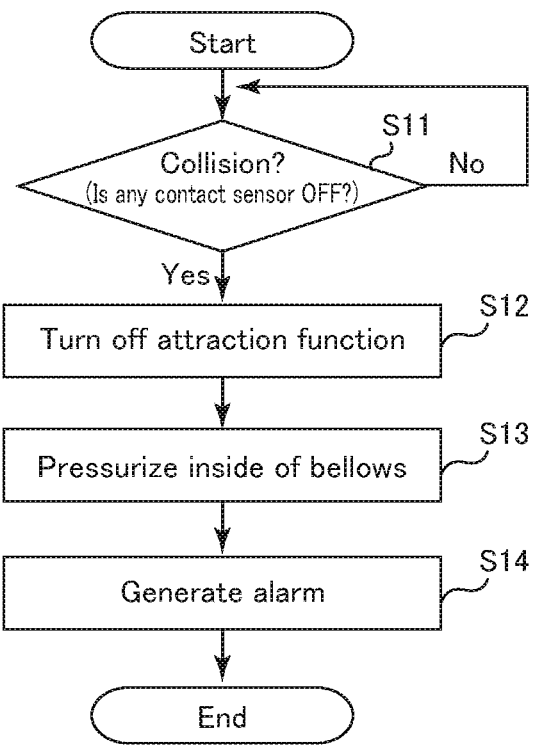
FIG. 6 is a flowchart showing a procedure of an impact mitigation operation by the end effector attachment apparatus according to the first embodiment.

As shown in FIG. 6, the end effector attachment apparatus 2 is in a normal state until the control apparatus 200 detects a collision of the end effector 400 with an obstacle (No in step S11). In the normal state, the inside of the bellows 5 is in a negative pressure state, and the attraction function of the attraction mechanism 7 is in an ON state. Specifically, as shown in FIG. 8(*a*), the pressurization/depressurization apparatus 300 discharges air inside the bellows 5 from the bellows port 51, supplies air into the cylinder 71 from the upper cylinder port 78, and discharges air inside the cylinder 71 from the lower cylinder port 79. The mount plate 6 is thereby kept fixed at the initial position. When the mount plate 6 is placed at the initial position, data indicating that the contact sensor 91 is ON is transmitted from all of the plurality of contact sensors 91 to the control apparatus 200. The control apparatus 200 determines that the end effector 400 has not collided with an obstacle.

When the control apparatus 200 receives data indicating that the contact sensor 91 is OFF from at least one of the plurality of contact sensors 91 (Yes in step S11), the control apparatus 200 determines that the end effector 400 has collided with an obstacle, and causes the end effector attachment apparatus 2 to execute the impact mitigation operation. As shown in FIG. 8(*b*), the pressurization/depressurization apparatus 300 discharges air inside the cylinder 71 from the upper cylinder port and supplies air into the cylinder 71 from the lower cylinder port in accordance with the control of the control apparatus 200. As a result, the magnet 75 is pulled up, and the attraction function of the attraction mechanism 7 is turned off (step S12). The pressurization/depressurization apparatus 300 supplies air into the bellows 5 from the bellows port 51 in accordance with the control of the control apparatus 200, so that the inside of the bellows 5 is pressurized (step S13). Since the mount plate 6 is in a free state due to step S12, the bellows 5 is extended by the pressurization of the inside of the bellows 5, and the mount plate 6 suspended from the bellows 5 is pushed down in the direction away from the base plate 3. The extended bellows 5 is in a state where the inside thereof is pressurized, and functions as a flexible rod-shaped cushioning member. Thereafter, the control apparatus 200 generates, for example, an alarm to notify the worker that the end effector 400 has collided with an obstacle (step S14). The worker stops the alarm by operating a button or the like, and removes the obstacle.

The above-described impact mitigation operation by the end effector attachment apparatus 2 according to the first embodiment has the following effects. As shown in FIG. 9, even if the end effector 400 collides with an obstacle S during horizontal movement, the bellows 5 is extended at the moment of the collision and functions as a flexible rod-shaped cushioning material, so that the force received by the end effector 400 from the obstacle S can be parried to some extent. In addition, even if the robot arm mechanism 100 cannot be stopped at the moment when the end effector 400 collides with the obstacle S, the bellows 5 extends and becomes a flexible rod-shaped material at the time of the collision, allowing a slight movement of the robot arm mechanism 100 from the time when the end effector 400 collides with the obstacle S until the robot arm mechanism 100 is stopped. This prevents the end effector 400 and the robot arm mechanism 100 from being damaged. In addition, even if the end effector 400 and the robot arm mechanism 100 are damaged, the degree of the damage can be suppressed to a light level.

Figure 7:
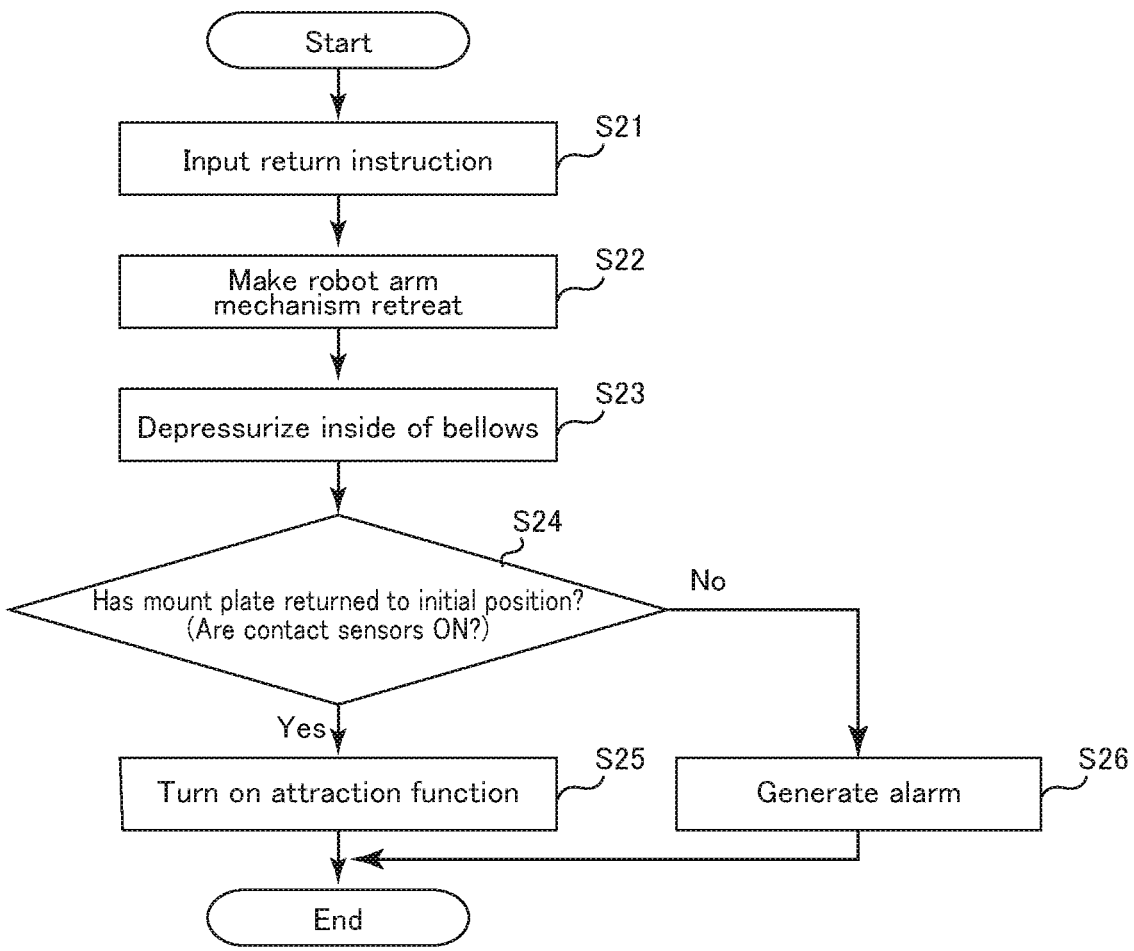
FIG. 7 is a flowchart showing a procedure of a return operation by the end effector attachment apparatus according to the first embodiment.

The return operation by the end effector attachment apparatus 2 according to the first embodiment will be described with reference to FIG. 7 and FIG. 8. When a return instruction is input by the worker, the control apparatus 200 executes the return operation of the end effector attachment apparatus 2 (step S21). Before the execution of the return operation, in the end effector attachment apparatus 2, the inside of the bellows 5 is in a pressurized state, and the attraction function of the attraction mechanism 7 is in an OFF state, as shown in FIG. 8(*b*). When the return operation is executed, the control apparatus 200 moves the robot arm mechanism 100 to a predetermined retreat position (step S22). This step may be performed manually. Next, the control apparatus 200 controls the pressurization/depressurization apparatus 300 to depressurize the inside of the bellows 5 (step S23). Specifically, as shown in FIG. 8(c), the pressurization/depressurization apparatus 300 discharges air inside the bellows 5 from the bellows port 51. As a result, the bellows 5 is contracted, and the mount plate 6 suspended from the bellows 5 is pulled up in the direction toward the base plate 3. The mount plate 6 that has reached a position close to the base plate 3 is further pulled up while being regulated by the positioning mechanism 8, and is returned to the initial position. The control apparatus 200 determines whether or not the mount plate 6 has been returned to the initial position, based on the outputs of the plurality of contact sensors 91 (step S24). For example, when data indicating that the contact sensor 91 is ON cannot be received from all the contact sensors 91 by the time a predetermined time has elapsed after starting to pull up the mount plate 6, the control apparatus 200 determines that the mount plate 6 has not been returned to the initial position (No in step S24).

Then, the control apparatus 200 generates an alarm to notify the worker that the return is incomplete (step S26). The worker stops the alarm by operating a button or the like, and manually returns the end effector attachment apparatus 2. On the other hand, when data indicating that the contact sensor 91 is ON is received from all the contact sensors 91 by the time a predetermined time has elapsed after starting to pull up the mount plate 6, the control apparatus 200 determines that the mount plate 6 has been returned to the initial position (Yes in step S24), and turns on the attraction function of the attraction mechanism 7 (step S25). Specifically, as shown in FIG. 8(d), air is supplied from the upper cylinder port into the inside of the cylinder 71, and air inside the cylinder 71 is discharged from the lower cylinder port. Accordingly, the mount plate 6 is attracted by the magnet 75 located in a lower part of the inside of the cylinder 71, and is fixed at the initial position. The end effector attachment apparatus 2 is returned to the state before the collision, and the end effector 400 is also returned to the position before the collision.

When it is determined in step S24 that the mount plate 6 has not been returned to the initial position, it may be due to the condition of the bellows 5, such as the bellows 5 being twisted. Therefore, before an alarm is generated in step S26, the bellows 5 may be extended and then contracted again, and the determination process of step S24 may be executed again.

According to the return operation by the end effector attachment apparatus 2 of the first embodiment, after removing the obstacle S with which the end effector 400 has collided, the worker can return the end effector attachment apparatus 2 to the state before the collision and return the end effector 400 to the position and orientation before the collision, only by inputting a return instruction to the control apparatus 200 through an operation of a mouse, a keyboard, a button, or the like. Since the position and orientation of the end effector 400 with respect to the robot arm mechanism 100 can be automatically adjusted by the positioning mechanism 8 of the end effector attachment apparatus 2, there is no need for the worker to adjust the position of the end effector 400 using a tool or the like. In addition, since whether or not the end effector attachment apparatus 2 has been returned to the state before the collision can be confirmed based on the outputs of the contact sensors 91, there is no need to measure the inclination or the like of the mount plate 6 of the end effector attachment apparatus 2 using a level or the like. As described above, according to the end effector attachment apparatus 2 of the first embodiment, it is possible to greatly simplify the work by the worker from the time when the end effector 400 collides with the obstacle to the time when it returns to the state before the collision, and to shorten the return time.

The end effector attachment apparatus 2 according to the first embodiment can add a lifting and lowering function to the end effector 400 by actively utilizing the extension/contraction operation of the bellows 5. In addition, for the end effector 400 having the lifting and lowing function, the stroke length of the lifting and lowing operation can be made longer than that of the end effector 400 alone.

Figure 10:
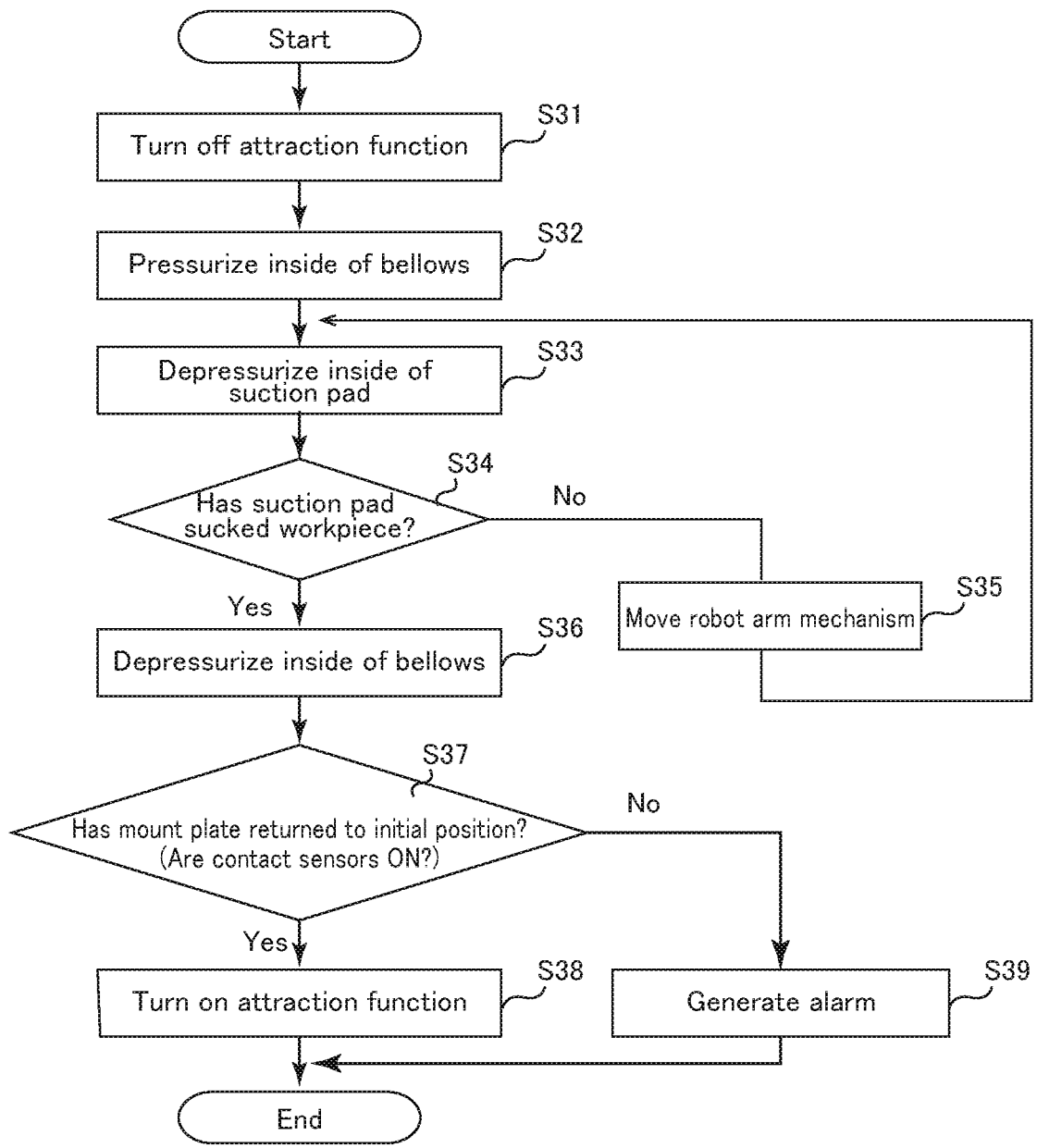
FIG. 10 is a flowchart showing a procedure of a lifting and lowing operation by the end effector attachment apparatus according to the first embodiment.

The lifting and lowing operation of the end effector attachment apparatus 2 will be described with reference to FIG. 10 and FIG. 11. Here, it is assumed that the workpiece W is sucked and held by the suction pad of the end effector 400. The control apparatus 200 moves the robot arm mechanism 100 to place the suction pad above the workpiece W. After the suction pad is placed above the workpiece W, the control apparatus 200 turns on the lifting and lowing operation of the end effector attachment apparatus 2. The control apparatus 200 controls the pressurization/depressurization apparatus 300 to turn off the attraction function of the attraction mechanism 7 (step S31), thereby pressurizing the inside of the bellows 5 (step S32). As a result, the suction pad is moved together with the mount plate 6 in a direction away from the base plate 3 (downward), and the suction surface thereof is brought into close contact with the surface of the workpiece W. The control apparatus 200 controls the pressurization/depressurization apparatus 300 to depressurize the inside of the suction pad (step S33). The control apparatus 200 determines whether or not the suction pad has sucked the workpiece W, for example, based on an image captured by a camera attached to the end effector 400 (step S34). When it is determined that the suction pad has not sucked the workpiece W (No in step S34), the control apparatus 200 moves the robot arm mechanism 100 to adjust the position of the suction pad (step S35), and executes the process of step S33 again. The processes of steps S33 to S35 are repeated until the suction pad sucks the workpiece W. When it is determined that the suction pad has sucked the workpiece W (Yes in step S34), the control apparatus 200 controls the pressurization/depressurization apparatus 300 to depressurize the inside of the bellows 5 (step S36). As a result, the suction pad that has sucked the workpiece W is pulled up together with the mount plate 6 in a direction toward the base plate 3 (upward). The control apparatus 200 determines whether or not the mount plate 6 has been returned to the initial position based on the outputs of the plurality of contact sensors 91 (step S37), and when it is determined that the mount plate 6 has not been returned to the initial position (No in step S37), an alarm is generated to notify the worker that the return is incomplete (step S39). The worker stops the alarm by operating a button or the like, and manually returns the end effector attachment apparatus 2. On the other hand, when it is determined that the mount plate 6 has been returned to the initial position (Yes in step S37), the attraction function of the attraction mechanism 7 is turned on (step S38). As a result, the mount plate 6 is fixed at the initial position, and the end effector attachment apparatus 2 is returned to the original state. If the workpiece W is only to be conveyed by the suction pad, the robot arm mechanism 100 may be moved to the release position of the workpiece W after suction of the workpiece W and release the depressurized state of the suction pad to release the workpiece W.

Figure 11:
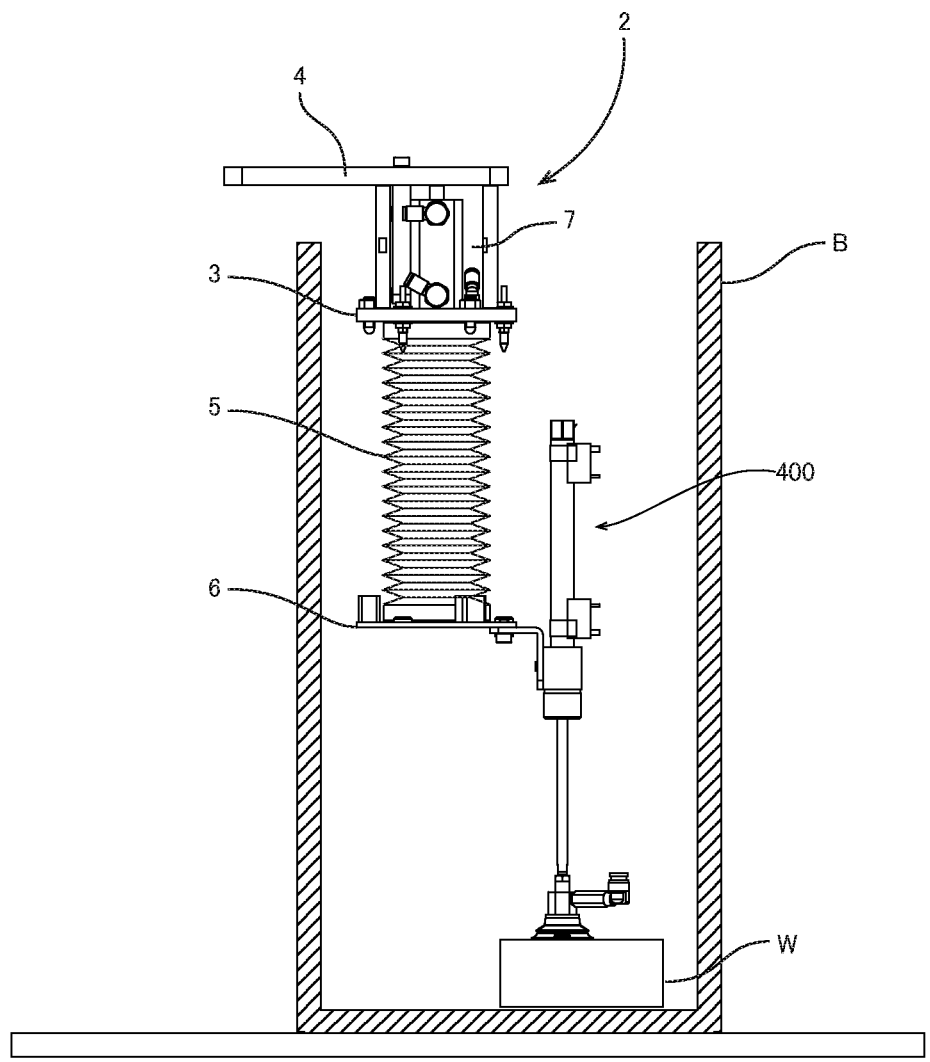
FIG. 11 is a diagram illustrating effects of the lifting and lowing operation by the end effector attachment apparatus according to the first embodiment.

As shown in FIG. 11, the lifting and lowing operation of the end effector attachment apparatus 2 allows the end effector 400 to approach a workpiece W disposed in a place with a narrow opening, such as a deep box B, into which the arm of the robot arm mechanism 100 cannot be lowered, but the end effector attachment apparatus 2 can be inserted, by making the bellows 5 of the end effector attachment apparatus 2 extend toward the workpiece W. By actively utilizing the extension/contraction operation of the bellows 5 of the end effector attachment apparatus 2, the stroke length of the lowering operation of the end effector 400 can be extended. In other words, the degree of freedom of the movement of the end effector 400 can be improved.

In addition, the end effector attachment apparatus 2 according to the first embodiment produces the following effects by actively utilizing the extension/contraction operation of the bellows 5. The increase in the load generated at an attraction point of the mount plate 6 attracted by the attraction mechanism 7 when the robot arm mechanism 100 accelerates or decelerates can be canceled by depressurizing the inside of the bellows 5 to increase the attraction force acting in the direction of the mount plate 6 approaching the base plate 3. For example, when the robot arm mechanism 100 accelerates or decelerates, the control apparatus 200 controls the pressurization/depressurization apparatus 300 to increase the degree of depressurization of the inside of the bellows 5 so as to increase the force to contract the bellows 5, thereby preventing the mount plate 6 from being separated from the base plate 3 against the attraction force of the attraction mechanism 7. This also contributes to improving the accuracy of the collision detection of the end effector 400 with an obstacle by the contact sensors 91.

Figure 12:
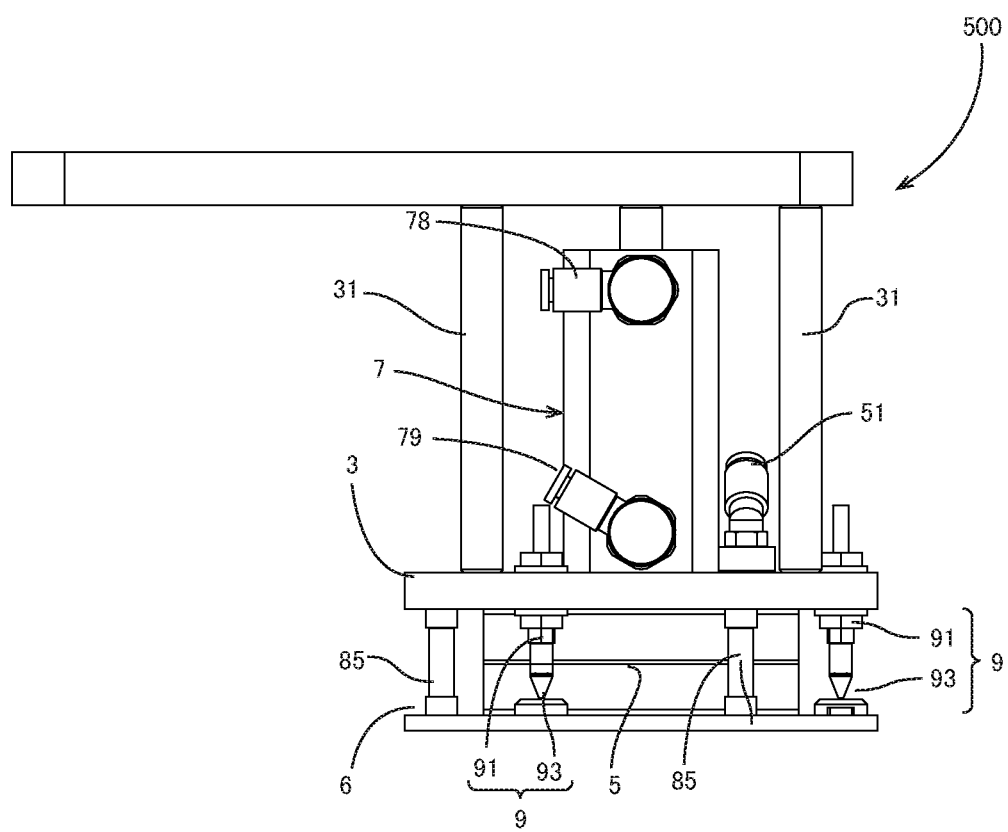
FIG. 12 is a side view showing another example of a positioning mechanism of the end effector attachment apparatus shown in FIG. 2 in a state where the bellows is contracted.
Figure 13:
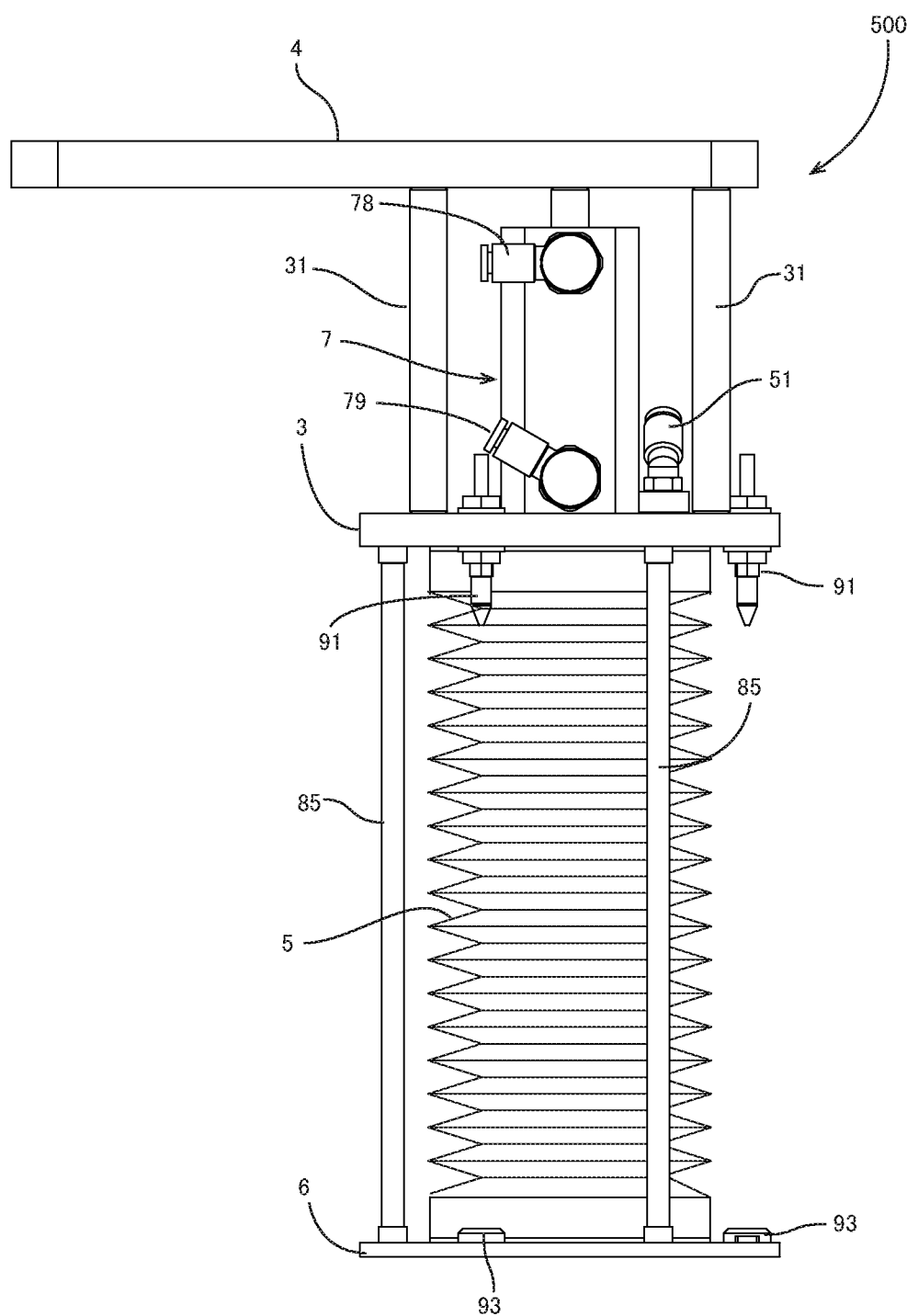
FIG. 13 is a side view showing another example of the positioning mechanism of the end effector attachment apparatus shown in FIG. 2 in a state where the bellows is extended.

An end effector attachment apparatus 2 according to a modification of the first embodiment will be described with reference to FIG. 12 and FIG. 13. In the end effector attachment apparatus 2 according to the first embodiment, the positioning mechanism 8 of the end effector attachment apparatus 2 is constituted by the ball plungers 81 and the ball receiving portions 83. An end effector attachment apparatus 500 according to a modification of the first embodiment uses a flexible tube having elasticity as the positioning mechanism 8 of the end effector attachment apparatus 2. As shown in FIG. 12 and FIG. 13, one end of a flexible tube 85 is fixed to the lower surface of the base plate 3, and the other end thereof is fixed to the upper surface of the mount plate 6. This allows the flexible tube 85 to produce the same effects as the positioning mechanism 8 constituted by the ball plungers 81 and the ball receiving portions 83.

An end effector attachment apparatus 600 according to the second embodiment will be described with reference to FIG. 14 and FIG. 15. The end effector attachment apparatus 2 according to the first embodiment uses the bellows 5 as a member for suspending the mount plate 6 from the base plate 3, and has the attraction mechanism 7 and the pressurization/depressurization apparatus 300 as a return mechanism for returning the mount plate 6 to the original position, but the suspending member is not limited to the bellows 5 as long as it can move the mount plate 6 toward and away from the base plate 3 and return the mount plate 6 separated from the base plate 3 to the initial position. The end effector attachment apparatus 600 according to the second embodiment uses a wire member 53, such as a string, as the suspending member, and has a winding device 55 for winding the wire member 53 as the return mechanism for returning the mount plate 6 to the original position.

Figure 14:
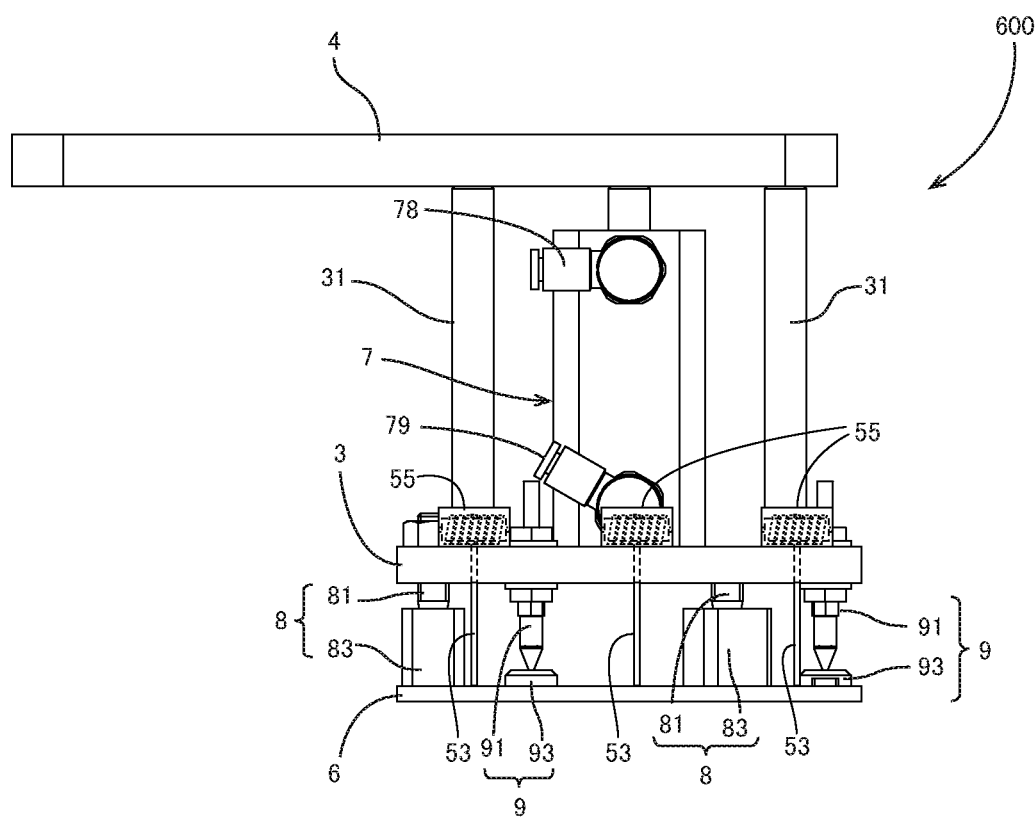
FIG. 14 is a side view showing an end effector attachment apparatus according to a second embodiment in a state where a wire member is wound up.
Figure 15:
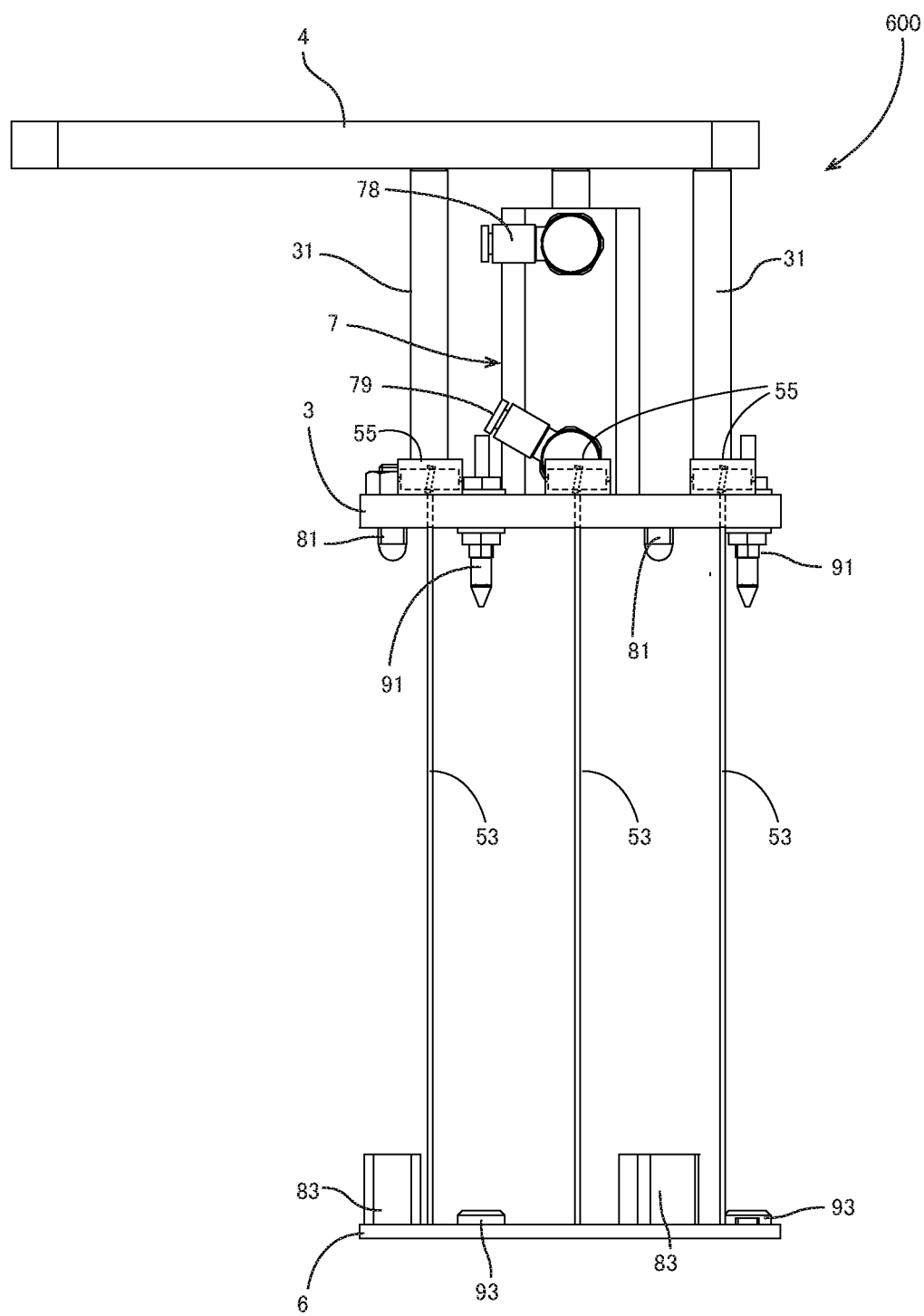
FIG. 15 is a side view showing the end effector attachment apparatus according to the second embodiment in a state where the wire member is sent out.

As shown in FIG. 14 and FIG. 15, the end effector attachment apparatus 600 according to the second embodiment includes a wire member 53 having elasticity for suspending the mount plate 6 from the base plate 3, and a winding device 55 for winding the wire member 53. The winding device 55 has a reel and a drive mechanism for driving the rotation of the reel, and is installed on the base plate 3. The wire member 53 is fixed at one end to the reel of the winding device 55, passes through a hole vertically penetrating the base plate 3, and is fixed at the other end to the mount plate 6. When the reel is rotated in the forward direction by the drive mechanism in accordance with the control by the control apparatus 200, the wire member 53 is fed from the reel, and the mount plate 6 is moved in a direction away from the base plate 3. When the reel is rotated in the reverse direction by the drive mechanism in accordance with the control by the control apparatus 200, the wire member 53 is wound onto the reel, and the mount plate 6 is pulled back in a direction toward the base plate 3.

The end effector attachment apparatus 600 according to the second embodiment has the same effects as the end effector attachment apparatus 2 according to the first embodiment.

The end effector attachment apparatus is interposed between the robot arm mechanism 100 and the end effector 400 in the first and second embodiments, but can also be used for various devices on which the end effector 400 is mounted, such as a moving device for moving the end effector 400.

The end effector attachment apparatus according to each of the first and second embodiments need not be a single apparatus. For example, the end effector attachment apparatus according to each of the first and second embodiments may be incorporated into an end effector, or into a robot arm mechanism. Such an end effector and a robot arm mechanism both have the same effects as the end effector attachment apparatuses according to the first and second embodiments.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. An end effector attachment apparatus to be attached to an end effector of a robot, comprising:
    a base plate;
    a mount plate on which the end effector is mounted;
    an attraction mechanism for attracting the mount plate to the base plate, wherein the attraction mechanism comprises a magnet;
    a bellows coupling the mount plate to the base plate; and
    a misalignment detection unit for detecting that the mount plate misaligns from a predetermined position relative to the base plate,
    wherein the misalignment detection unit comprises contact sensors,
    wherein front and rear edges of the bellows are sealed to the base plate and the mount plate so as to secure a sealed space inside the bellows, when the misalignment detection unit detects that the mount plate misaligns from the predetermined position relative to the base plate, an attracted state where the mount plate is attracted to the base plate by the attraction mechanism is released, and the inside of the bellows is pressurized to extend the bellows and separate the mount plate from the mount plate, and the inside of the bellows is depressurized to contract the extended bellows and return the separated mount plate to the predetermined position, and the attracted state where the mount plate is attracted to the base plate by the attraction mechanism is returned to fix the mount plate at the predetermined position.

2. The end effector attachment apparatus according to claim 1, further comprising a positioning mechanism for positioning the mount plate at the predetermined position with respect to the base plate, wherein the positioning mechanism comprises ball plungers, and wherein the inside of the bellows is depressurized to contract the extended bellows and position the separated mount plate at the predetermined position by the positioning mechanism, and the attracted state where the mount plate is attracted to the base plate by the attraction mechanism is returned to fix the mount plate at the predetermined position.

3. An end effector comprising the end effector attachment apparatus according to claim 1.

4. A robot arm mechanism incorporating the end effector attachment apparatus according to claim 1.

5. An end effector attachment apparatus to be attached to an end effector of a robot, comprising:

a base plate;

a mount plate on which the end effector is mounted;

a wire member for suspending the mount plate from the base plate;

a winding device for feeding and winding the wire member, wherein the winding device comprises a reel; and a misalignment detection unit for detecting that the mount plate misaligns from a predetermined position relative to the base plate, wherein the misalignment detection unit comprises contact sensors, wherein when the misalignment detection unit detects that the mount plate misaligns from the predetermined position relative to the base plate, the winding device feeds the wire member to separate the mount plate from the base plate, and the winding device winds the wire member to return the mount plate to the predetermined position.

6. The end effector attachment apparatus according to claim 5, further comprising a positioning mechanism for positioning the mount plate at the predetermined position with respect to the base plate, wherein the positioning mechanism comprises ball plungers.

* * * * *